June 16, 1931.  C. B. ULRICH  1,810,378
BASE FOR TYPEWRITERS AND OTHER ARTICLES
Filed March 14, 1928
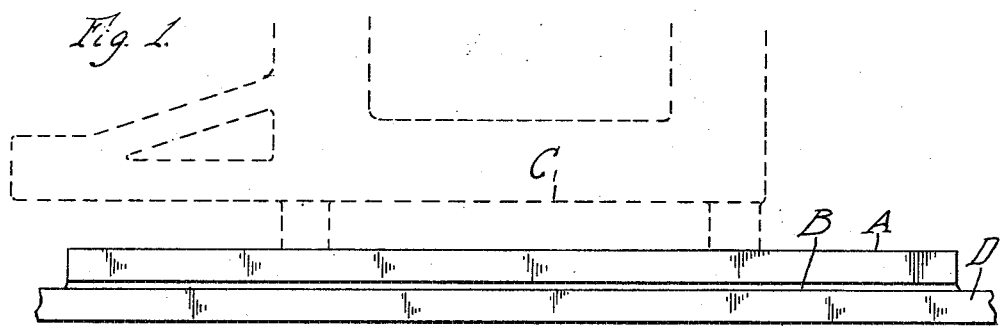
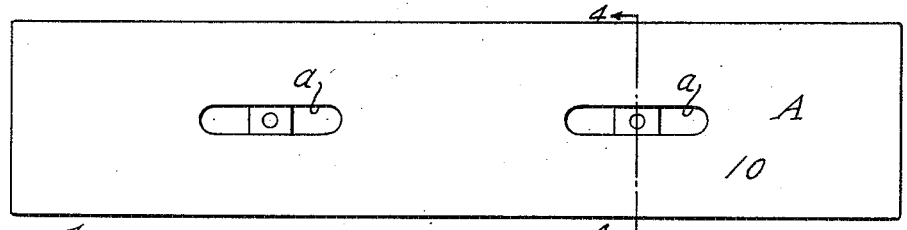
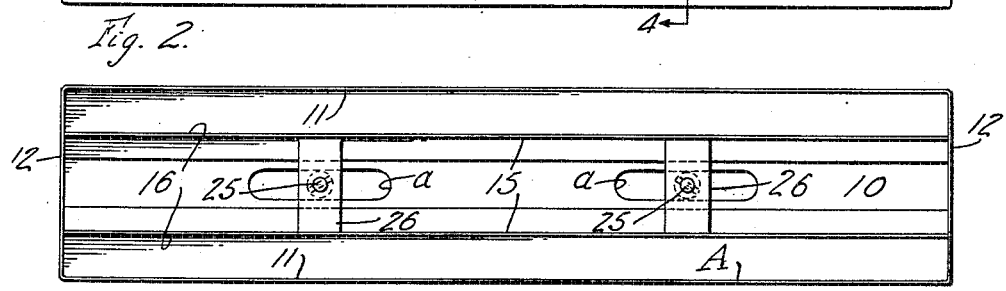
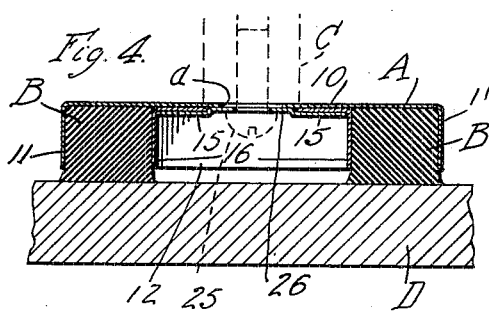
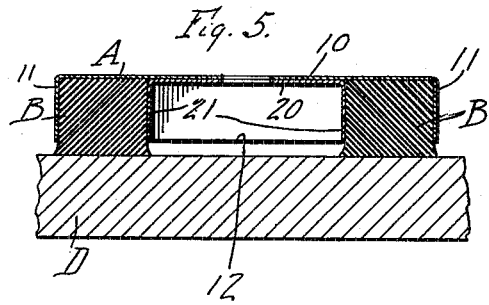
INVENTOR
Charles B. Ulrich
by Parker & Prochnow
ATTORNEYS.

Patented June 16, 1931

1,810,378

UNITED STATES PATENT OFFICE

CHARLES B. ULRICH, OF JAMESTOWN, NEW YORK, ASSIGNOR TO ART METAL CONSTRUCTION COMPANY, OF JAMESTOWN, NEW YORK

BASE FOR TYPEWRITERS AND OTHER ARTICLES

Application filed March 14, 1928. Serial No. 261,655.

This invention relates to supports or bases for typewriters, and more particularly to supports or bases of the kind which include a resilient part or pad interposed between the typewriter and the table or support on which it stands.

It has heretofore been customary to place on the feet of a typewriter, rubber cushioning devices which were intended to absorb noises or vibrations of the typewriting machine. It was found, however, that if these devices were made of a soft rubber and of sufficient thickness to absorb some of the noises and vibrations, they would also produce "jumping" or swaying of the typewriter which interfered greatly with the speed at which the machine could be operated and with the quality of work produced, so that the soft rubber devices had to be replaced by devices made of harder rubber, which produced very little reduction in the noise made by the machine.

It has consequently been found that when using devices of this kind of harder rubber, the typewriter could not be placed on the same desk or support with a phonographic reproducing device, since the noise of the typewriter would be magnified by the reproducing device so that the dictation on the record of the dictating machine could not be heard while the typewriter was operating.

The objects of this invention are to provide a typewriter support or sub-base of improved construction by means of which a thick pad or cushion of very soft rubber can be used, which will absorb a large percentage of noise and vibrations without producing the objectionable "jumping" of the typewriter.

Also to provide a support or base which is so made as to fit all types or makes of typewriters and which is of simple and durable construction, also to improve the construction of devices of this kind in other respects hereinafter specified.

In the accompanying figures:—

Fig. 1 is a side elevation of a typewriter support or sub-base embodying this invention, showing the same on a table or desk top and showing in dotted lines the lower portion of a typewriter frame.

Fig. 2 is a top plan view of the typewriter support or sub-base.

Fig. 3 is a bottom plan view thereof with the resilient inserts removed.

Fig. 4 is a transverse sectional elevation thereof on an enlarged scale on line 4—4, Fig. 2.

Fig. 5 is a similar transverse sectional view of a support or base of slightly modified construction.

The typewriter support or base preferably includes two elongated supporting or base members, each of which is adapted to be secured to two of the feet or legs of the typewriter, and each of these base members preferably includes a rigid or metal frame A in which a strip or pad B of cushioning material may be supported. The rigid frame member A is preferably provided with suitable slots or apertures $a$ through which screws, bolts or other fastening devices may pass to secure the base to the typewriter. C in Fig. 1 represents the lower portion of a typewriter and D represents a table or desk top or other surface on which the typewriter stands.

The frame holder A for the flexible or resilient material may be of any suitable or desired construction, that shown being in the form of a channel having a substantially flat surface 10 and downwardly extending flanges 11 which are adapted to engage the sides of the resilient members B.

The frame member may also have downwardly extending flanges 12 at the opposite ends thereof, the downwardly extending flanges serving to confine the resilient material in the frame members. These frame members with their flanges, may, if desired be stamped or drawn from a single flat piece of metal.

In the particular construction shown in the drawing two resilient or flexible supporting members B are employed although it will be understood that one or more than two may be used if desired. The resilient members are preferably made of a very soft rubber such, for example, as sponge rubber, which has a large number of small voids or air spaces throughout the material. By cutting this rubber into pads or strips for use in connection with the base shown in the drawing many of these voids will be cut, thus forming cup-shaped openings in the outer surfaces of the resilient members. The cup-shaped recesses on the lower face of the resilient members will act as suction cups in connection with the top surface of the desk or table D and thus prevent slipping or sliding of the base upon the supporting surface.

In order to prevent this soft rubber from yielding to its fullest extent when the typewriter is in use and thus producing an objectionable jumping of the typewriter, the sides of the resilient members are preferably confined or held against spreading laterally. This reduces the springiness of the resilient members without detracting in any way from their ability to absorb noises, prevents the transmission of noises and vibrations to the desk or table top D. For this purpose, in the particular construction shown in Figs. 1 to 4, a pair of angle shaped members 15 is provided each having one flange welded or otherwise secured to the under face of the flat top 10 of each frame member A, and the other flange 16 extending downwardly preferably parallel with the flanges 11, thus forming with the flanges 11 parallel channels adapted to receive the upper portions of the resilient pads B.

The channels are preferably of such depth as to permit at least half of the cushions or pads B to enter into the channels. The lower portions of these resilient pads extend below the lower edges of the flanges 11 and 16 so that the frame members of the base are kept out of contact with the surface on which the typewriter is supported. In the modified construction shown in Fig. 5 a channel shaped member is provided having an upper web 20 which is welded or otherwise secured to the under surface of the top 10 of the frame of the sub-base. The channel shaped member has oppositely arranged, downwardly extending flanges 21 which form with the downwardly extending flanges 11, channels for the reception of the resilient or cushioning members B.

The typewriter may be secured to the base by means of screws or bolts 25 (Figs. 3 and 4), extending through the slots a and a clip 26 may be used on the lower face of the frame member A. These clips extend crosswise of the frame members of the base and are preferably so shaped as to engage the under surfaces of the middle portion of the frame A and the lower surfaces of the flanges 15. These clips transmit the pressure of the screws or bolts 25 over a more extended surface of the frame member, but the clips may be omitted, or other means may be used in places of the clips. The clips are adjustable lengthwise of the slots to adapt themselves for different distances between legs of different machines. The screws and bolts have a threaded engagement with parts of the typewriter and extend through the slots a so that the frames A of the base may be rigidly secured to the typewriter. By making the base in two parts and by providing slots a in each part, ample leeway is permitted so that these base members may be secured to any size or make of typewriter, the differences in widths of different makes or sizes being compensated for by the spacing of the two base members further apart or closer together, and the distances between the front and rear legs of the typewriter being compensated for by the slots a.

The structure described has the advantage of entirely preventing the transmission of sound from the typewriter to the desk top on which the typewriter stands and provide a yielding support, or base having a large surface of contact with the desk top so that a very soft or porous rubber or other composition may be used in the members B. The construction of the frame members confines the greater portion of the rubber or resilient members B against sliding and prevents the objectionable jumping of the typewriter when operated at high speed. By means of the sub-base described, a phonographic reproducing machine may be mounted on the same desk or table with the typewriter since the sub-base prevents the transmission of any noise to the reproducing mechanism of the phonographic machine.

The term typewriter is herein used in a broad sense and intended to include billing and bookkeeping machines, adding machines and any other office equipment, which produce noise or vibrations while in use, or which are to be protected from the transmission of sound or vibrations thereto from other machines.

I claim as my invention:

1. A vibration absorbing support for a typewriter or similar article, including a rigid frame member upon which the article is supported and having a plurality of relatively long and narrow recesses formed in the lower face thereof, a soft resilient cushion extending into certain of said recesses and having a relatively small portion thereof extending beyond the walls of said recesses, the walls of the recesses lightly engaging said cushion to avoid interfering with the vibration absorbing properties of the portion of the cushion within said recess.

2. Vibration absorbing means for interposing between a typewriter or similar article and a supporting base, including a pair of rigid frame members, each arranged to support a portion of the weight of the article and each having a plurality of elongated relatively narrow recesses on its lower face, strips of sponge rubber having the greater portions thereof confined within certain of said recesses and extending slightly below the walls of said recesses to rest on the supporting base, said strips constituting the sole connection between said article and the supporting base, the upper portions of said strips being held against horizontal displacement by the upright walls of said recesses, to form a firm support for the article and to prevent execssive movement of the article relatively to a supporting base, such as would interfere with the use of the article, without impairing the vibration absorbing properties of said strips, each of said frame members being apertured intermediate of said pads to enable attachment of the article thereto.

CHARLES B. ULRICH.